(No Model.)
F. O. MATTHIESSEN.
BONE BLACK FILTER FOR FILTERING SUGAR LIQUOR.
No. 329,185. Patented Oct. 27, 1885.
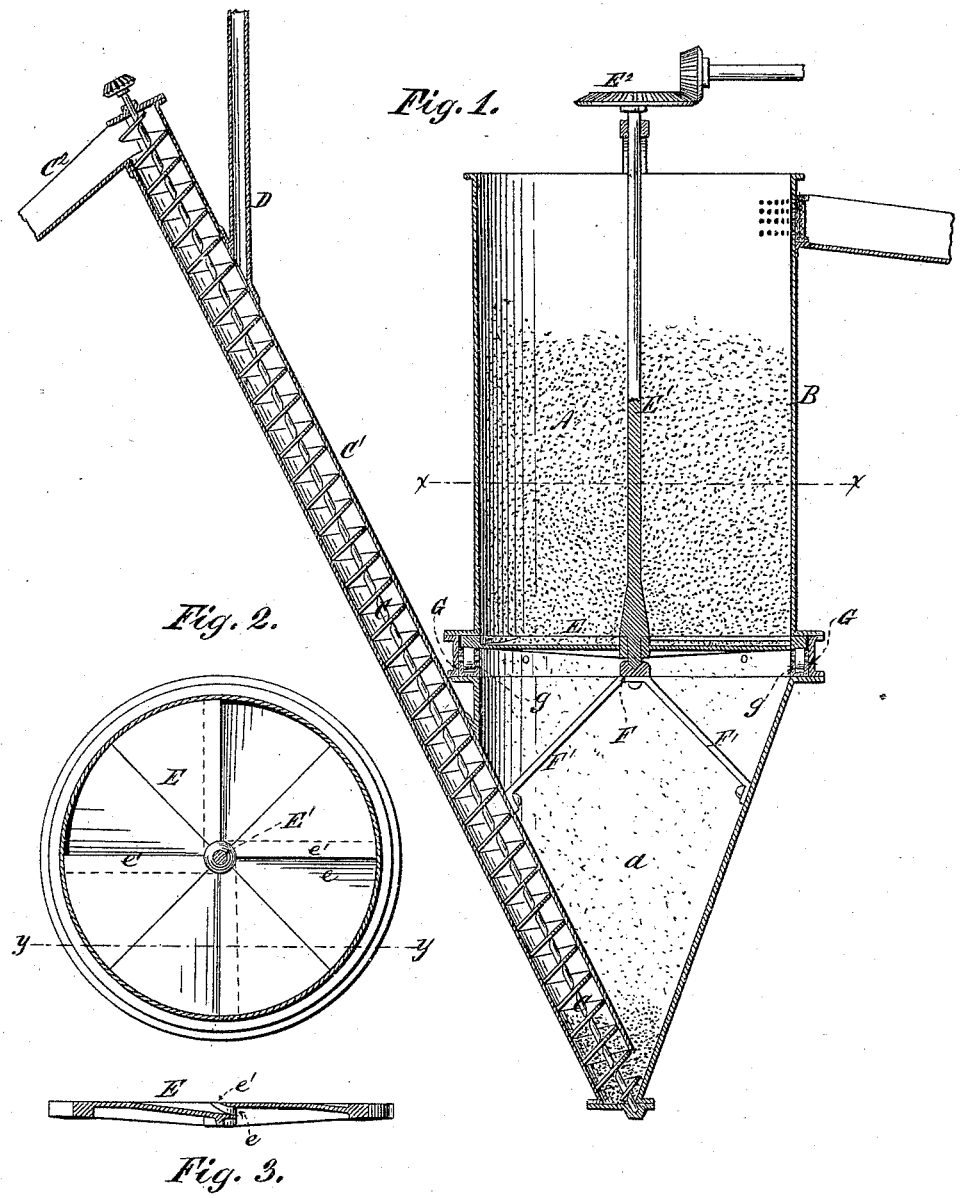
Witnesses:
M. L. Adams
R. C. Howes
Inventor:
F. O. Matthiessen
Per Edw. E. Quimby
Atty.

United States Patent Office.

FRANZ O. MATTHIESSEN, OF IRVINGTON, NEW YORK.

BONE-BLACK FILTER FOR FILTERING SUGAR-LIQUORS.

SPECIFICATION forming part of Letters Patent No. 329,185, dated October 27, 1885.

Application filed May 18, 1885. Serial No. 165,829. (No model.)

*To all whom it may concern:*

Be it known that I, FRANZ O. MATTHIESSEN, of Irvington, New York, have invented certain Improvements in Bone-Black Filters for Filtering Sugar-Liquors, of which the following is a specification.

In bone-black filters for filtering sugar-liquor by the process of upward filtration the lowest stratum of bone-black is that which soonest becomes exhausted; and it is the object of my improvement to provide for the gradual and uniform removal of the lowest stratum of bone-black without causing any violent falling movement of the superincumbent mass of bone-black, so that concurrently with the removal of the exhausted bone-black fresh bone-black can be introduced into the top of the filter, where the filtered sugar-liquor is discharged; and my invention consists in supporting a mass of bone-black in a filter-chamber upon the uppermost convolution of a screw rotating upon a vertical axis, or upon the upper surface of a suitably perforated or slotted rotating disk provided with a shearing blade or blades. By the rotation of the said screw or the said disk the exhausted bone-black is gradually removed or cut off from the lower end of the mass of superincumbent bone-black, and is allowed to fall into a receiving-chamber, from which it is removed by any convenient means—as, for example, a screw conveyer or conveyers.

The accompanying drawings represent my improvement in the form in which I prefer to employ it applied to a bone-black filter provided with an elevator-screw incased in a suitable tube for removing the exhausted bone-black from the bottom of the filter or receiving-chamber.

Figure 1 is a central vertical section through the filter and elevator-tubes. Fig. 2 is a horizontal section through the line *x x* on Fig. 1, showing the top of the discharger. Fig. 3 is a vertical section of the discharger, taken through the line *y y* on Fig. 2.

In the filter shown in the drawings the principal body of bone-black, A, is contained in a large vertical cylinder, B, and rests at the bottom upon the discharger E, beneath which is the receiving-chamber *a*, into which the exhausted bone-black is caused to fall by the action of the discharger E. From the receiving-chamber the exhausted bone-black is removed by means of the inclined elevator-screw C, incased in the inclined tube C', the upper end of which is provided with the chute $C^2$, upon which the spent bone-black elevated by the screw C falls by its own gravity. The sugar-liquor to be filtered, introduced into the upper part of the inclined tube C' by means of the supply-pipe D, falls through the inclined tube C' into the receiving-chamber and rises by hydrostatic pressure through the mass of bone-black contained in the filtering-chamber B and is discharged through suitably-screened openings from the upper part of the chamber B.

The discharger in the form which I prefer consists of a horizontal disk, E, affixed to the central vertical shaft, E', which is provided with a suitable bearing at the top of the filter, and projects therefrom, and is provided with a pulley or toothed wheel, $E^2$, by means of which power is imparted to rotate it. The lower end of the vertical shaft E' is provided with a bearing upon the upper surface of the horizontal beam F, which extends across the receiving-chamber, and is secured to the side wall thereof, and which has its central portion supported by the inclined braces F' F'.

In the case of a filter, and consequently of a discharger of large diameter, it will be desirable to support the rim as well as the center of the discharger. This may be effected by means of conical rollers *g g g g*, &c., which have their axes radially arranged, and are provided with bearings in a circular frame, G, securely fastened to the interior wall of the filter-cylinder B. The under surface of the rim of the discharger is slightly chamfered, as shown, and bears upon the tops of these conical rollers.

The discharger E is provided with a series of openings, *e*, extending from its central portion outward nearly to its perimeter. These openings are so far inclined as to prevent the bone-black from running through them merely by its own gravity, and their upper edges constitute the shearing-blades *e'*, which, when the discharger is rotated in the direction of the arrow shown in Fig. 2, shear or scrape the bone-black from the lower surface of the mass of bone-black contained in the filter-chamber B, and thus cause it to be forced through the inclined openings $e$, from which it falls into the bottom of the receiving-chamber $a$.

When the elevating-screw is employed for removing the spent bone-black from the receiving-chamber $a$, the latter is preferably made in the form of an inverted cone, the lower end of which is united to the lower part of the inclined tube or cylinder $C'$, in which the elevator-screw C is contained.

In operation, after the apparatus has been filled with sugar-liquor, the rate at which the sugar-liquor is introduced through the supply-pipe D, and consequently the rate at which it is discharged from the upper part of the chamber B, is graduated with reference to maintaining the sugar-liquor in contact with the bone-black for the length of time required to perfectly decolorize it. On the other hand, the speed of rotation of the discharger is regulated with reference to effecting the uniform and gradual removal of the exhausted bone-black from the lower part of the mass of bone-black contained in the chamber B as rapidly as the bone-black at that point becomes exhausted, and fresh bone-black is fed into the upper end of the chamber B at a rate corresponding with that at which the exhausted bone-black is removed. By this means the operation of filtration is performed continuously, and all the sugar-liquor passed through the filter is subjected to like conditions, both as to duration of contact with bone-black and as to contact with bone-black which is not exhausted. At the same time there is no violent disturbance of the mass of bone-black sufficient to materially disturb the current of sugar-liquor and interfere with the efficient decolorizing action of the bone-black.

I claim as my invention—

1. In a bone-black filter for filtering sugar-liquor by the process of upward filtration, a filtering-chamber having at the bottom a discharger in the form of a screw or slotted disk provided with a shearing blade or blades, and means for rotating said discharger for the purpose of gradually removing the exhausted bone-black from the bottom of the mass of bone-black contained in the filtering-chamber, in combination with a receiving-chamber for receiving said exhausted bone-black, and means for removing the said exhausted bone-black from the receiving-chamber, substantially as set forth.

2. A filtering-chamber for containing bone-black, having arranged beneath it a receiving-chamber, and provided with means for the gradual lowering of the bone-black from the filtering-chamber into the receiving-chamber, in combination with an inclined elevator-screw contained in a correspondingly-inclined tube for removing the exhausted bone-black from the receiving-chamber, substantially as set forth.

F. O. MATTHIESSEN.

Witnesses:
ROBT. MOELLER,
D. M. VAN VORST.